O. TYBERG.
UNIVERSAL LATHE.
APPLICATION FILED NOV. 20, 1905. RENEWED MAR. 12, 1910.
972,297.
Patented Oct. 11, 1910.
4 SHEETS—SHEET 3.
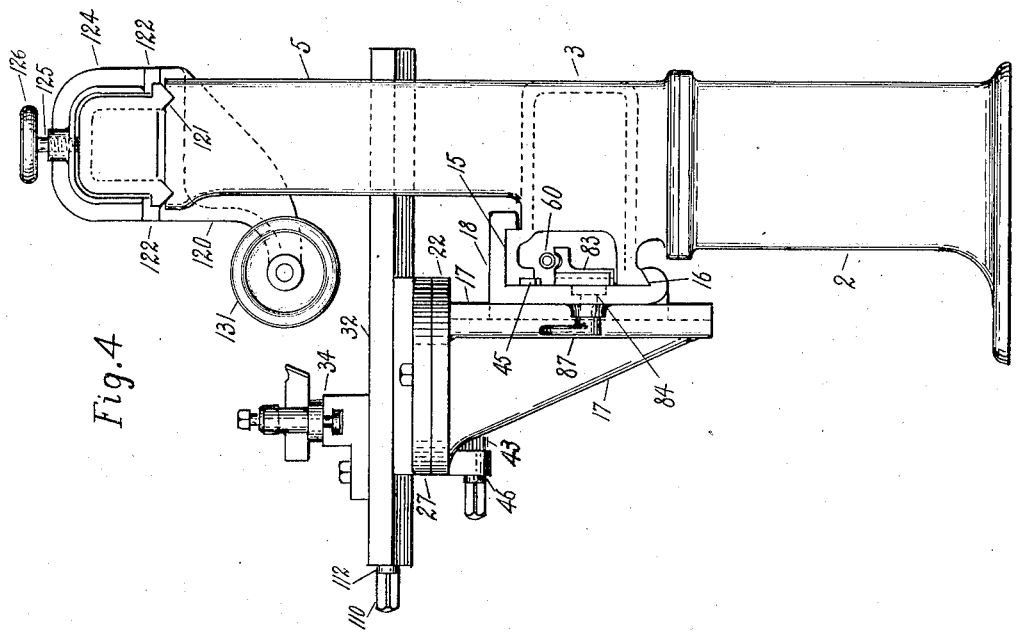
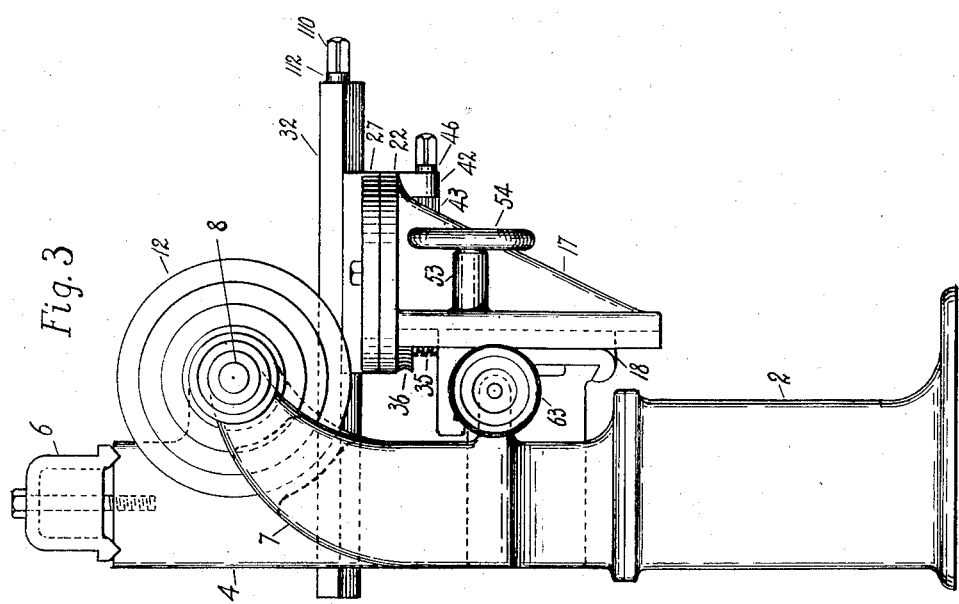
WITNESSES:
INVENTOR O. TYBERG.
UNIVERSAL LATHE.
APPLICATION FILED NOV. 20, 1905. RENEWED MAR. 12, 1910.
972,297.
Patented Oct. 11, 1910.
4 SHEETS—SHEET 4.
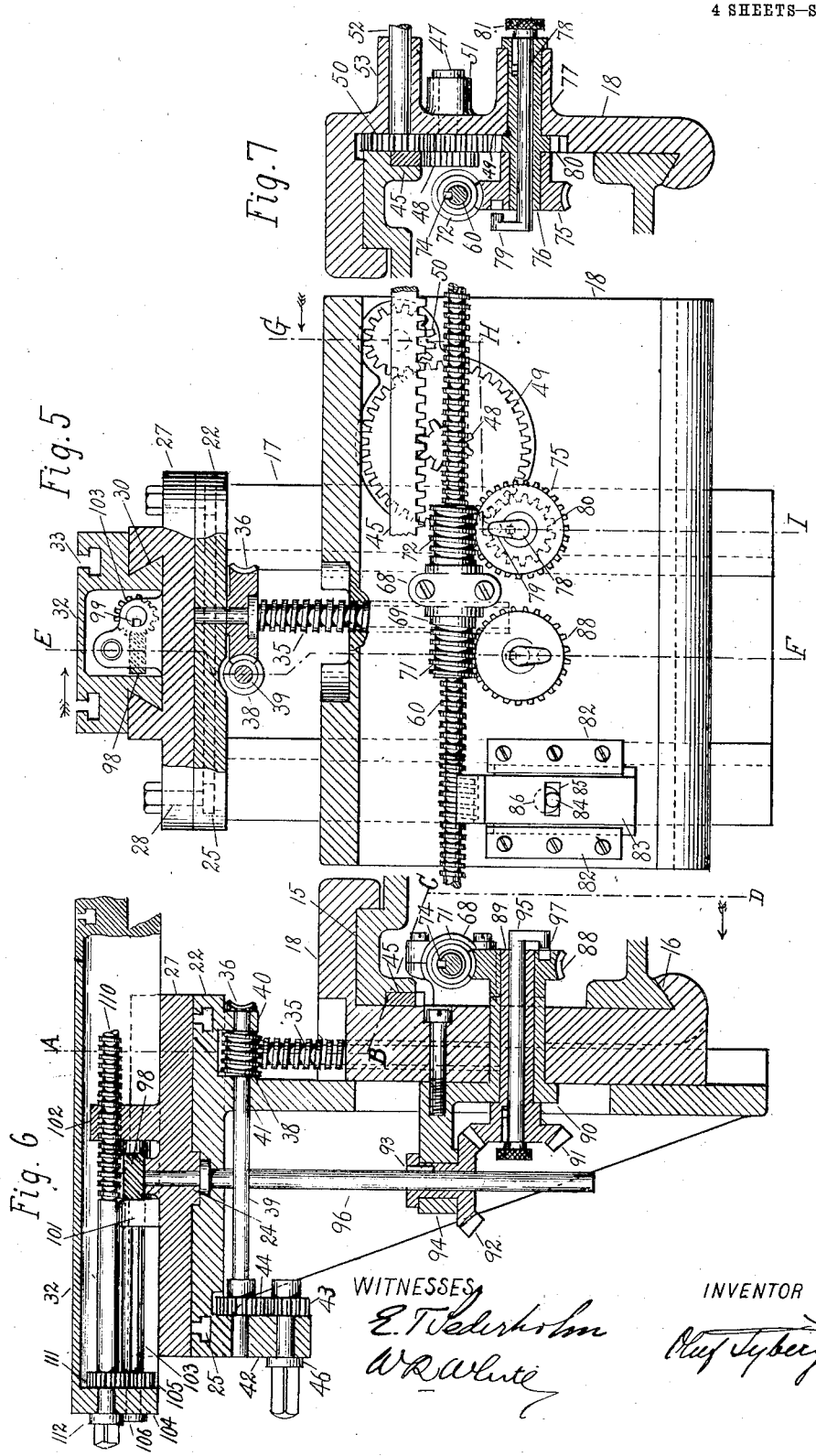

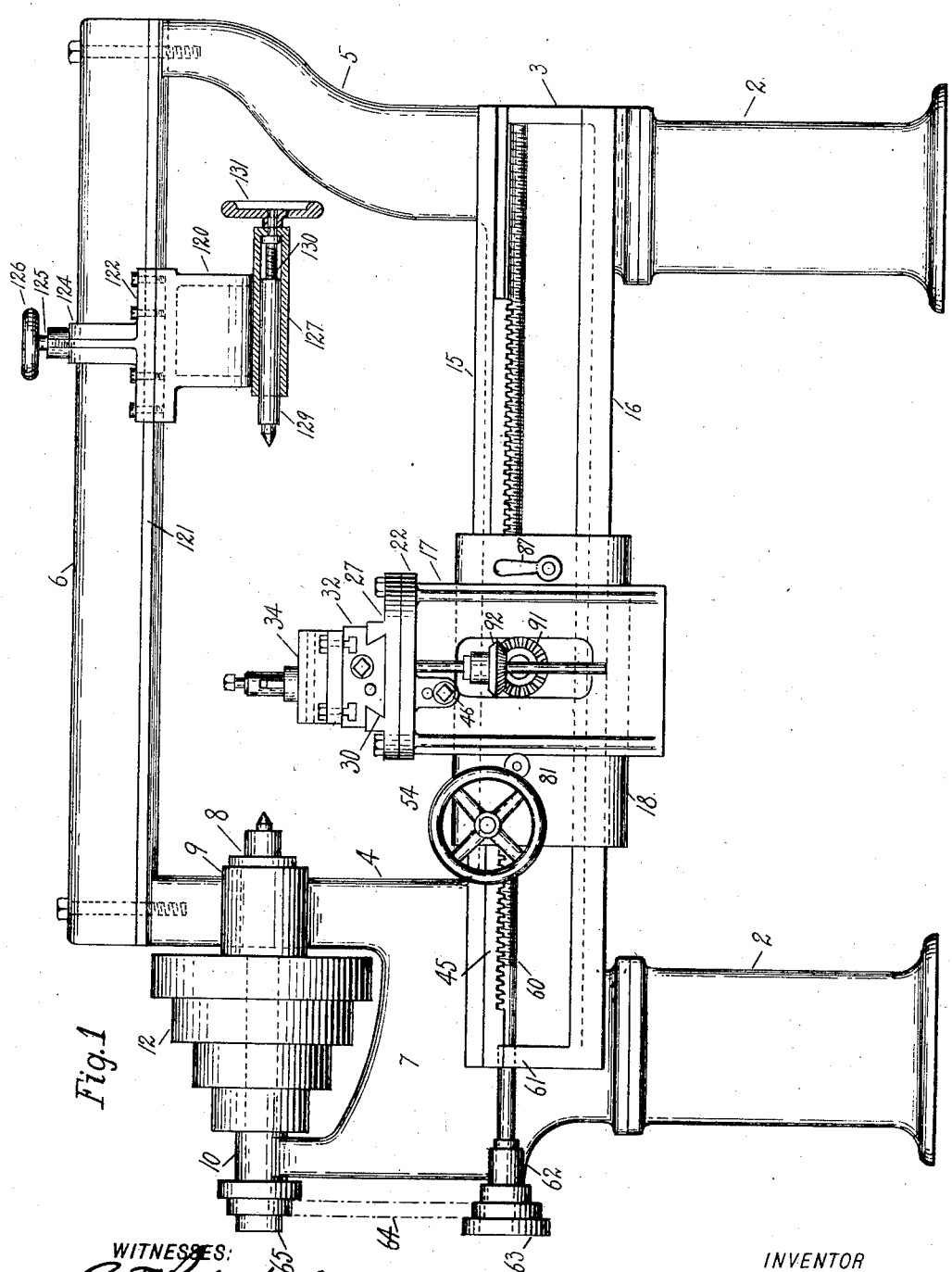

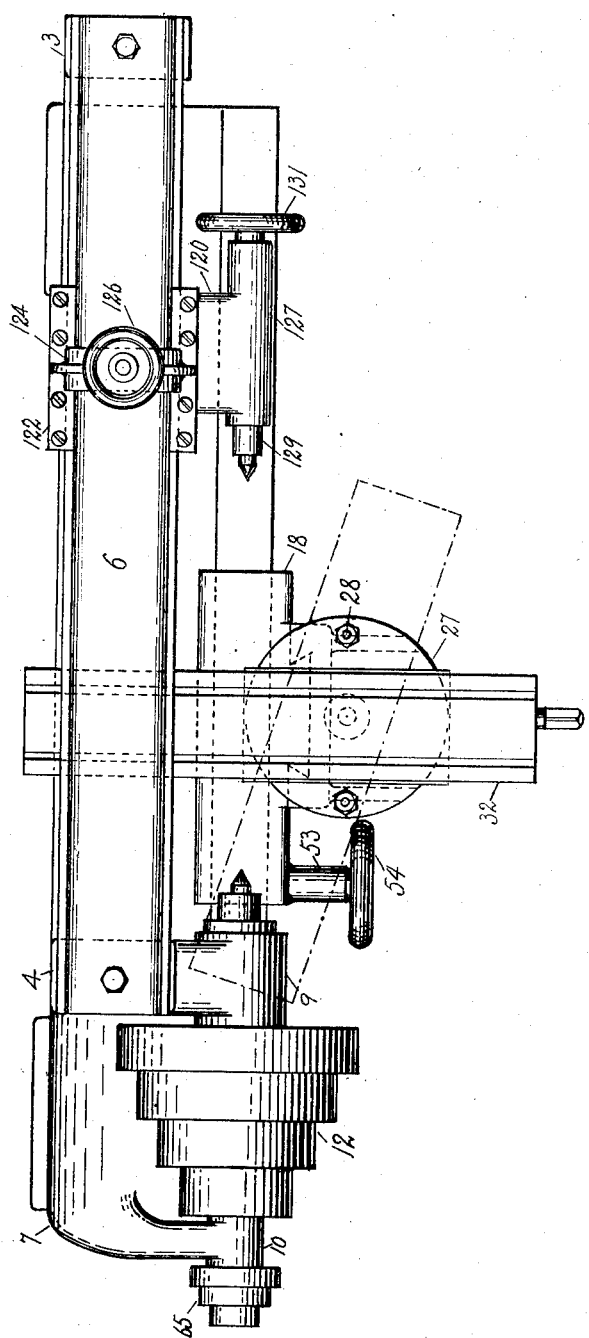

UNITED STATES PATENT OFFICE.

OLUF TYBERG, OF POINT LOMA, CALIFORNIA.

UNIVERSAL LATHE.

972,297.  Specification of Letters Patent.  Patented Oct. 11, 1910.

Application filed November 20, 1905, Serial No. 288,101. Renewed March 12, 1910. Serial No. 549,008.

*To all whom it may concern:*

Be it known that I, OLUF TYBERG, a citizen of the United States, residing at Point Loma, in the county of San Diego and State of California, have invented certain new and useful Improvements in Universal Lathes, of which the following is a specification.

This invention relates to the class of machine tools commonly known as "engine lathes", the distinctive features of which are a frame or bed to which is secured a head stock supporting a continuously revolving spindle, and provided with means for revolving the spindle at different speeds. The frame is provided with ways running parallel to the axis of the head stock spindle upon which the carriage and tail stock are slidingly mounted. Means are provided for feeding the carriage directly from the revolving head stock spindle as well as independently by hand. The tail stock, which supports an adjustable center spindle is provided with means for clamping it in different positions against the ways of the frame. In using the terms headstock, tailstock and carriage in this application, I refer only to such construction as embraces the above specified features.

The object of this invention is to construct a lathe in such a manner as to make it capable of doing a large variety of work besides turning, such as boring and milling in all its various forms, and in a simple and direct way, and this invention illustrates a machine tool, which contains in a modified form, not only all the features of a lathe with head stock, tail stock, automatically fed carriage and cross feed, etc., but also modified features of a universal milling machine with head stock, overhanging arm, adjustable knee, automatically fed swinging table, etc.; and my invention relates to the novel construction, by means of which these features have been combined in one machine tool, which I have termed a universal lathe, and the invention consists in constructing an upright four sided open frame; across the unobstructed space or opening inclosed by the frame the axis of the head spindle extends. A tail stock is slidingly mounted on the upper part of the frame above the axis of the head spindle, and a carriage is slidingly mounted on the lower part of the frame below the axis of the head spindle. The carriage supports a cross slide, which is capable of being fed into the opening of the frame at different angles, and of being fed across said opening both vertically and horizontally, and is also provided with means for feeding the cross slide automatically in two directions.

Reference being had to the accompanying drawings, Figure 1 is a front elevation of the universal lathe; Fig. 2 a plan elevation of the same; Fig. 3 an end elevation taken from the head stock end; Fig. 4 an end elevation taken from the tail stock end; Fig. 5 a partially sectional view of the carriage on an enlarged scale on the lines A B C D of Fig. 6; Fig. 6 is a section of the carriage on the lines E F of Fig. 5; Fig. 7 is a section of the carriage on the lines G H I of Fig. 5.

Similar numbers refer to similar parts throughout the several views.

Mounted on and supported by two legs or standards 2, 2, is an upright open frame consisting of a horizontal beam 3 at each end of which is mounted two upright connecting beams 4 and 5, to which horizontal beam 6 is secured. Said frame may be cast in one piece or made of separate parts and bolted together. In my preferred construction, the two connecting beams 4 and 5 are made in one piece with the horizontal beam 3, while the horizontal beam 6 is bolted to the connecting beams.

Connected to the frame is the head stock 7. Said head stock may be cast in one piece with the frame, or it may be bolted thereto. In my preferred construction it is made part of the connecting beam 4. Said head stock may also be constructed in any suitable manner, and in accordance with any of the well-known constructions now in general use, and for the sake of illustration I have selected the simpler form of a casting, supporting a front bearing 9 and a rear bearing 10, in which the main driving spindle 8 is mounted. The spindle 8 is mounted parallel with the horizontal beams 3 and 6 and is placed above the one and below the other in such a manner that its axis extends across the opening of the frame. Between said bearings and secured to the spindle 8, is a main driving cone pulley 12. In my preferred construction the bearings 9 and 10 are not centrally located with reference to the frame, but are made to project out in front of the frame, in order to bring the spindle 8 more directly over the carriage; also in order to permit the cross slide to be moved in under the spindle, and for other reasons hereinafter referred to. The carriage may be mounted upon the horizontal beam 3 in any suitable manner. In my preferred construction the carriage slide 18 is mounted upon the front face of horizontal beam 3, and fitted to and free to slide upon the upper way 15 and lower way 16, which as shown, form part of horizontal beam 3 and are projected out in front of the frame. The carriage may be constructed in any suitable manner. The carriage may be provided with a plain cross slide capable of feeding into the opening of the frame, or may be provided with additional means for vertical adjustment, but in my preferred construction it is designed to support a universally adjustable cross slide, that is, one that is capable of feeding into the opening of the frame at different angles, as well as across said opening in the vertical and horizontal plane. In my preferred construction, a knee 17 is slidingly mounted in vertical ways on the front face of the carriage slide 18. Said knee has a circular top plate 22, in the upper side of which is a central circular recess 24, and an annular T slot 25 (Figs. 5 and 6). Mounted upon said top plate is the cross slide support 27, which is fitted to swing freely in said circular recess, and by means of bolts 28, the heads of which are free to slide in said annular T slot, may be clamped to the knee 17 at any angle. In horizontal ways 30, of cross slide support 27, the cross slide 32 is slidingly mounted. In the top of said cross slide are T slots 33, by means of which a suitable tool post 34 (shown in Figs. 1 and 4) may be secured, when the machine is used for turning. In case of milling or boring, by means of the T slots the work may be clamped to the cross slide. In Fig. 2 is indicated, by broken lines, one of the angular positions in which the cross slide can be placed. It will be observed that by this construction of the carriage, great rigidity of the several parts is obtained, particularly as the knee is mounted on ways located on the front face of the carriage, close to the carriage ways 15 and 16, and directly beneath the axis of the head stock spindle, just where it is subjected to the greatest strain, whether the lathe be used for turning or milling.

The means for the vertical adjustment of the knee 17 may be made in any suitable manner. In my preferred construction, the lower end of a vertical feed screw 35 (Figs. 5 and 6) is fitted into the carriage slide 18. The upper end of said feed screw is journaled in the top plate 22 of the knee, and just below the top plate, and secured to the feed screw 35 is a worm wheel 36, upon the top face of which the knee rests. A worm 38, secured on a shaft 39, mounted in bearings 40, 41 and 42, engages said worm wheel 36. A gear 44, secured to the opposite end of said shaft 39, engages another gear 43, which is secured to a shaft 46, mounted in a downward extension of bearing 42. The opposite end of shaft 46 is squared, in order that a handle (not shown) may be attached thereto, and by turning which, through the intermediate mechanism just referred to, the knee 17 and cross slide 32 may be raised and lowered.

The feeding of the carriage by hand may be done in any suitable manner. In my preferred construction a rack 45 is secured to the front face of the horizontal beam 3, which is engaged by a pinion 48, (Figs. 5 and 7) mounted on a shaft 47, in bearing 51 of the carriage slide 18. A larger gear 49 is also secured to shaft 47, between pinion 48 and bearing 51. Gear 49 is engaged by another pinion 50, secured to the end of a shaft 52, which is mounted in bearing 53, of carriage slide 18. On the other end of shaft 52, a hand wheel 54 is secured by the turning of which the carriage, through the intermediate mechanism just referred to, can be moved in either direction.

The automatic feed for the carriage may be made in any suitable manner, and in accordance with any of the well-known constructions now in general use in lathes, and for illustration I have shown the simpler form of a feed rod 60, mounted in the horizontal beam 3 in bearings 61 and 62. A cone pulley 63 is secured to the end of feed rod 60, and a belt 64 (indicated by broken lines in Fig. 1) drives feed rod 60, from a cone pulley 65, secured to the rear end of the main driving spindle 8. It will be readily seen, that when required, a chain of gears, such as is now in general use in lathe constructions, may be substituted for the pulleys and belt. A bearing 68 is mounted upon the inside face of carriage slide 18, (Figs. 5 and 6) and supports a revolving bushing 69, which extends out beyond each side of bearing 68, and terminates in two worms 71 and 72, and which again supports the feed rod. While the feed rod 60 is threaded for purposes hereinafter set forth, the bushing 69 has a smooth bore, in order that the feed rod may freely slide through it endwise, but is made to turn with the feed rod by means of an inserted key 74, which is secured in bushing 69, and which is free to slide in a corresponding keyway on the feed rod. A worm wheel 75, (Figs. 5 and 7) engages worm 72, and is loosely mounted on a hollow shaft 76. Said hollow shaft is mounted in bearing 77 of the carriage slide 18. Through the center of hollow shaft 76 is fitted a clutch rod 78, which has a limited end motion, but is splined to the hollow shaft in order that they may turn together. At one end of clutch rod 78, is a lug which carries the clutch pin 79, and at the other end is secured a hand knob 81, by means of which the clutch pin may either be thrown into engagement with the worm wheel 75, whereby the hollow shaft 76 is made to revolve with the worm gear, or out of engagement as shown in the drawing. On the hollow shaft 76 is secured a pinion 80, which engages the teeth of gear 49, above referred to. It will thus be seen that when the clutch pin 79 is in engagement with worm wheel 75, said worm wheel, through pinion 80, revolves gear 49, and pinion 48, and as the latter engages rack 45, the carriage is moved automatically upon the ways of horizontal beam 3, and when the clutch pin is out of engagement with worm wheel 75, (as shown in Fig. 7) the carriage may be freely fed by the hand wheel.

In addition to the carriage feed above referred to, is also shown another carriage feed, commonly known as the screw feed, where the carriage is fed directly by means of the screw thread on the feed rod 60 in the following manner: On the inside of the carriage slide 18, (Figs. 4 and 5) is slidingly mounted in two guides 82, a slide 83. The upper part of slide 83 is shaped and threaded to engage the threads on the under side of feed rod 60, and can be moved out of and into engagement by means of an eccentric pin 84, fitted into the elongated slot 85 of slide 83. At the other end of shaft 86, upon which said eccentric pin 84 is mounted, is a handle 87, by the turning of which the feed is controlled.

The cross slide feed may be constructed in any suitable manner. My preferred construction is as follows: Connected with worm 71 (above referred to) is a worm wheel 88 (Figs. 5 and 6), loosely mounted on the end of hollow shaft 89. Said hollow shaft is mounted in a bushing 90 secured in carriage slide 18. To the other end of said hollow shaft is secured a bevel gear 91, which engages another bevel gear 92, mounted in bearing 94, which is an extension of bushing 90. In the hollow shaft 89 is a clutch rod 95, having a clutch pin 97, constructed in a similar manner to clutch rod 78, above referred to. A vertical shaft 96 is mounted in a bearing through the central recess of cross slide support 27, and extends downward through the hole in bevel gear 92, in which it is free to slide endwise, but constructed to revolve with the bevel gear by means of a key 93, fitted into the bevel gear which is free to slide in a corresponding keyway in shaft 96. A spiral gear 98 is secured to the upper end of shaft 96 and engages with another spiral gear 99, fitted between bearings 101 and 102, and upon a shaft 103 mounted in said bearings, which are secured in cross slide support 27. The shaft 103 has another bearing 104 in the front end of the cross slide 32, to which it is held endwise by means of gear 105 and collar 106. Shaft 103 will therefore move with the cross slide 27 and is made to slide freely in bearings 101 and 102 and also in spiral gear 99, while a key of the spiral gear 99 fits into a corresponding keyway of shaft 103, which will make these revolve together. A feed screw 110, which runs the full length of cross slide 32, has a bearing in the end of same, and is held in place by gear 111 and collar 112. Beyond said collar feed screw 110 is squared in order that a handle (not shown) may be applied thereto. The teeth of gear 111 mesh with the teeth on gear 105. The feed screw 110 is threaded and is fitted into a corresponding nut in the upward extension of bearing 102. It will thus be seen that when the clutch rod is thrown into engagement with worm wheel 88, this wheel, through the intermediate mechanism above described, will revolve the feed screw 110 and thus feed cross slide 32, and also, when the clutch is out of engagement, by means of a handle applied to feed screw 110, the cross slide may be fed by hand.

The tail stock may be constructed, and mounted to the horizontal beam, in any suitable manner. In my preferred construction, the tail stock 120 is secured to bottom ways 121 of horizontal beam 6, by means of two straps 122, which are fastened on each side of the top face of tail stock 120, and are resting on side projections of beam 6. The straps 122 are connected by a yoke 124, which forks beam 6, and in the top of which is a binding screw 125, to be operated by a hand wheel 126 secured thereto. By clamping said binding screw, the tail stock is forced up against bottom ways 121, and secured thereto; while by releasing the binding screw, the tail stock is free to be moved along the horizontal beam by sliding upon the side projections of same.

The tail stock has a bearing 127, the axis of which is projected out in front of the frame, and in line with the axis of the head stock spindle. In bearing 127 is mounted a sleeve 129, which is operated by a screw 130, to which is attached the hand wheel 131. It will be seen, that by projecting the axis of the head stock and tail stock bearings out in front of the frame, the hand wheel 131 is entirely free of the frame, when the tail stock is moved back to the end of the horizontal beam.

Many details of construction, many well-known devices and attachments, such as are now adopted and used in standard lathes and milling machines, have purposely been left out of the drawing accompanying this application, as they bear no relation to the subject matter of this invention. But it will readily be seen that all such devices as back gearing in the head stock, change gearing, reverse action and automatic stops for the carriage and cross feed, and also attachments such as index centers, vertical milling attachment, etc., are as well adaptable to the style of construction embodied in this invention as to that of any of the present styles of lathes and milling machines.

I claim as my invention:

1. In an engine lathe the combination of an upright open frame formed by two horizontal beams connected at each end by upright connecting beams; of parallel ways on said horizontal beams, on which the carriage and tail stock are respectively mounted; and of a head stock spindle mounted to said frame in such a manner that its axis projects out in front of and extends across the opening of said frame.

2. In an engine lathe, the combination of an upright open frame having upper and lower ways, with a head stock spindle mounted on said frame, the axis of which projects out in front of, and extends across the opening of, said frame; a tail stock mounted on the upper ways above said spindle, and a carriage on the lower ways; a vertically adjustable cross-slide mounted on the carriage, capable of traveling across said opening, and to feed into said opening.

3. In an engine lathe, the combination of an upright open frame having lower and upper ways on which the carriage and tail stock are respectively mounted, a head stock spindle mounted in said frame, the axis of which extends across the opening of said frame, and a vertically adjustable cross slide mounted on said carriage and supported in vertical ways which are situated directly beneath the axis of said spindle.

In testimony whereof I affix my signature in presence of two witnesses.

OLUF TYBERG.

Witnesses:
E. T. SEDERHOLM,
W. R. WHITE.